United States Patent
Kimura (10) Patent No.: US 9,134,144 B2
(45) Date of Patent: Sep. 15, 2015

(54) DISPLACEMENT DETECTING DEVICE, SCALE CALIBRATING METHOD AND SCALE CALIBRATING PROGRAM

(71) Applicant: MITUTOYO CORPORATION, Kawasaki-shi, Kanagawa (JP)

(72) Inventor: Akihide Kimura, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 289 days.

(21) Appl. No.: 13/659,213

(22) Filed: Oct. 24, 2012

(65) Prior Publication Data

US 2013/0099106 A1    Apr. 25, 2013

(30) Foreign Application Priority Data

Oct. 25, 2011    (JP) ................... 2011-233748

(51) Int. Cl.
| | | |
|---|---|---|
| *G01D 5/34* | (2006.01) | |
| *G01D 5/244* | (2006.01) | |

(52) U.S. Cl.
CPC ........ *G01D 5/24495* (2013.01); *G01D 5/24452* (2013.01)

(58) Field of Classification Search
CPC ................ G01D 5/24495; G01D 5/24452
USPC ........................ 250/231.13–231.19
See application file for complete search history.

(56) References Cited

U.S. PATENT DOCUMENTS

| | | | |
|---|---|---|---|
| 6,029,363 A | 2/2000 | Masreliez et al. | |
| 2004/0007664 A1 | 1/2004 | Mitchell | |
| 2004/0245444 A1* | 12/2004 | MacDougall | 250/231.19 |
| 2006/0043964 A1 | 3/2006 | Watanabe et al. | |
| 2008/0111062 A1* | 5/2008 | Wong et al. | 250/231.13 |
| 2012/0245876 A1* | 9/2012 | Watanabe | 702/94 |

FOREIGN PATENT DOCUMENTS

| | | |
|---|---|---|
| EP | 2500695 A1 | 9/2012 |
| JP | 61-292014 | 12/1986 |

(Continued)

OTHER PUBLICATIONS

European Search Report, Application No. 12188797.0 dated Nov. 18, 2013, 10 pages.

(Continued)

*Primary Examiner* — Thanh Luu
(74) *Attorney, Agent, or Firm* — Rankin, Hill & Clark LLP (57) ABSTRACT

A displacement detecting device includes: a scale which has an optical lattice; a detecting unit which is disposed so as to be movable in a scanning direction relative to the scale, inclusive of at least a first detection portion, a second detection portion and a third detection portion, arranged in the scanning direction for detecting position information from the optical lattice; and a calculating portion configured to obtain a self-calibration curve on graduations of the scale by specifying positions of the detection portions and calculating measurement error based on the position information detected by the detecting unit, wherein: the detecting unit is provided so that a distance between the first detection portion and the second detection portion and a distance between the second detection portion and the third detection portion are different from each other and do not form an integral multiple.

9 Claims, 8 Drawing Sheets

(56) References Cited

FOREIGN PATENT DOCUMENTS

| | | | |
|---|---|---|---|
| JP | 6-317431 | | 11/1994 |
| JP | 11-248489 | | 9/1999 |
| JP | 2008-224578 | | 9/2008 |
| WO | WO2011/055661 | * | 5/2011 |

OTHER PUBLICATIONS

"Intelligent Precision Measurement", Satoshi Kiyono, The Japan Society for Precision Engineering, 2009, vol. 75, No. 1, pp. 89-90, Discussed on pp. 2-3 of specification.

European Office Action dated Nov. 12, 2014, 6 pages.

* cited by examiner

DISPLACEMENT DETECTING DEVICE, SCALE CALIBRATING METHOD AND SCALE CALIBRATING PROGRAM

BACKGROUND

1. Field of the Invention

The present invention relates to a displacement detecting device, a scale calibrating method and a scale calibrating program applied to a linear encoder, a rotary encoder, etc.

2. Description of the Related Art

Generally, measurement error of a displacement measuring device such as an encoder is evaluated before shipment. A highly accurate displacement sensor such as a laser interferometer is used for a reference for error evaluation. The thus obtained error data are shipped in the form of a pre-shipment inspection table together with the encoder so as to be used as important data for warranting performance of the encoder.

However, the scale of the encoder may be distorted according to the material and length of the scale and the fixing method when the scale of the encoder is attached to an application such as a machine tool, a measuring device, etc. In some cases, non-negligible level measurement error in regard to a required specification may be caused by the generated distortion of the scale so that reliability of error data evaluated in advance will be spoiled.

As a method for solving this problem, it is thought of that a reference displacement sensor is set up in a user's application to apply on-machine calibration to the measurement error of the encoder. It is however undesirable that a burden is imposed on the user in consideration of the labor for setting up the displacement sensor and the price of the highly accurate displacement sensor.

On the other hand, for example, methods for self-calibration measurement error on graduations of a scale (JP-A-2008-224578 and "Satoshi Kiyono, "Intelligent Precision Measurement", The Japan Society for Precision Engineering, 2009, Vol. 75, No. 1, pp. 89-90") are known in this type displacement detecting device. Use of these self-calibration methods permits measurement error of an encoder to be calibrated without any highly accurate displacement sensor set up in an application.

However, when configuration is made in such a manner that a plurality of sensors are arranged at intervals of predetermined distance as disclosed in JP-A-2008-224578 and "Satoshi Kiyono, "Intelligent Precision Measurement", The Japan Society for Precision Engineering, 2009, Vol. 75, No. 1, pp. 89-90", the sampling interval of measurement error becomes equal to the pitch of arrangement of the sensors. For this reason, measurement error having a period not longer than twice as long as the arrangement pitch cannot be restored correctly, so that the frequency of measurement error allowed to be calibrated is limited.

Although it may be thought of that the pitch of arrangement of the sensors is narrowed to solve this problem, such a minimum distance that the sensors do not interfere with one another physically is required as the arrangement pitch. For this reason, narrowing the pitch of arrangement of the sensors is limited.

Moreover, use of a highly accurate displacement sensor such as a laser interferometer or preparation of a reference sensor or the like is not desirable because configuration becomes uselessly expensive. When measurement error of a non-negligible level is caused by distortion of the scale at the time of mounting or the like, it may be necessary to set up the reference displacement sensor again and a lot of cost and labor is still required.

SUMMARY

The invention is accomplished to solve such a problem and an object of the invention is to provide a displacement detecting device, a scale calibrating method and a scale calibrating program which can be formed easily and inexpensively without any laser interferometer, any reference scale, etc. so that measurement error on graduations can be calibrated accurately.

A displacement detecting device according to the invention includes: a scale which has an optical lattice; a detecting unit which is disposed so as to be movable in a scanning direction relative to the scale and which has n (n is an integer not smaller than 3) detection portions, inclusive of at least a first detection portion, a second detection portion and a third detection portion, arranged in the scanning direction for detecting position information from the optical lattice; and a calculating portion configured to obtain a self-calibration curve on graduations of the scale by specifying positions of the detection portions and calculating measurement error based on the position information detected by the detecting unit; wherein: the detecting unit is provided so that a distance between the first detection portion and the second detection portion and a distance between the second detection portion and the third detection portion are different from each other and do not form an integral multiple; and the calculating portion obtains the self-calibration curve on the graduations of the scale by repeating operation of moving the detecting unit in the scanning direction until position information detected by one of the first to third detection portions is detected by another detection portion, and calculating measurement error based on the detected position information and a distance between the detection portions which have detected the position information.

In this configuration, the sampling interval which is an interval for acquiring output data can be set to be shorter than the distance between detection portions of the detecting unit, so that a self-calibration curve having finer graduations can be obtained. Accordingly, measurement error can be corrected accurately by an inexpensive configuration.

In one embodiment of the invention, a difference of the distance between the first detection portion and the second detection portion from the distance between the second detection portion and the third detection portion is shorter than a minimum distance d in which the n detection portions can be arranged physically.

In another embodiment of the invention, the calculating portion reciprocates the detecting unit in the scanning direction and acquires the position information.

In a further embodiment of the invention, the displacement detecting device further includes: a storage unit which stores the self-calibration curve; wherein: the calculating portion corrects measurement error of the graduations by referring to the self-calibration curve stored in the storage unit.

A scale calibrating method according to the invention is a scale calibrating method in a displacement detecting device including a scale which has an optical lattice, a detecting unit which is disposed so as to be movable in a scanning direction relative to the scale and which has n (n is an integer not smaller than 3) detection portions, inclusive of at least a first detection portion, a second detection portion and a third detection portion, arranged for detecting position information from the optical lattice so that a distance between the first detection portion and the second detection portion and a distance between the second detection portion and the third detection portion are not different from each other and do not form an integral multiple, and a calculating portion configured to obtain a self-calibration curve on graduations of the scale by specifying positions of the detection portions and calculating measurement error based on the position information detected by the detecting unit, the method including: the detecting step of repeating operation of moving the detecting unit in the scanning direction until position information detected by one of the first to third detection portions is detected by another detection portion; the calculating step of obtaining the self-calibration curve on the graduations of the scale by calculating measurement error based on the detected position information and a distance between the detection portions which have detected the position information; and the correcting step of correcting the position information of the optical lattice by referring to the obtained self-calibration curve.

A scale calibrating program according to the invention is a scale calibrating program for making a computer execute a scale calibrating method in a displacement detecting device including a scale which has an optical lattice, a detecting unit which is disposed so as to be movable in a scanning direction relative to the scale and which has n (n is an integer not smaller than 3) detection portions, inclusive of at least a first detection portion, a second detection portion and a third detection portion, arranged for detecting position information from the optical lattice so that a distance between the first detection portion and the second detection portion and a distance between the second detection portion and the third detection portion are not different from each other and do not form an integral multiple, and a calculating portion configured to obtain a self-calibration curve on graduations of the scale by specifying positions of the detection portions and calculating measurement error based on the position information detected by the detecting unit, the program including: the detecting step of repeating operation of moving the detecting unit in the scanning direction until position information detected by one of the first to third detection portions is detected by another detection portion; the calculating step of obtaining the self-calibration curve on the graduations of the scale by calculating measurement error based on the detected position information and a distance between the detection portions which have detected the position information; and the correcting step of correcting the position information of the optical lattice by referring to the obtained self-calibration curve.

According to the invention, it is possible to make configuration easily and inexpensively so as to be able to calibrate measurement error on graduations of a scale accurately.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

A displacement detecting device, a scale calibrating method and a scale calibrating program according to embodiments of the invention will be described below in detail with reference to the accompanying drawings.

Figure 1:
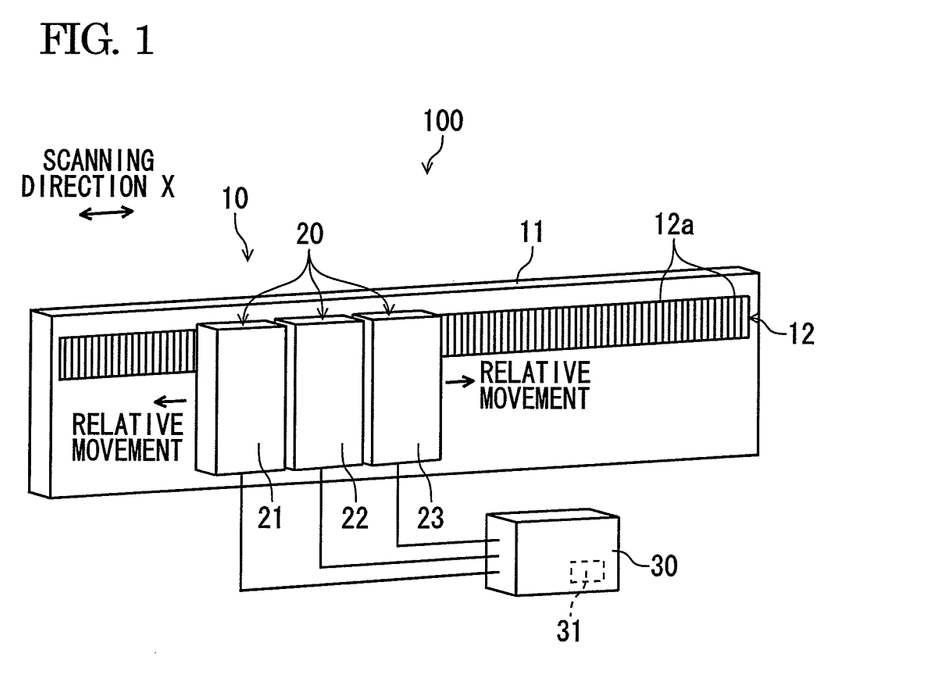
FIG. 1 is a schematic view showing a configuration of a photoelectric encoder which forms a displacement detecting device according to an embodiment of the invention.

FIG. 1 is a schematic view showing a configuration of a photoelectric encoder which forms a displacement detecting device according to an embodiment of the invention. As shown in FIG. 1, the photoelectric encoder 100 has a scale 10, a detecting unit 20, and a calculating portion 30. For example, the photoelectric encoder 100 is formed as a reflective type in this embodiment.

For example, the scale 10 is constituted by a tape scale and has position information for detecting positions of measurement points of detection portions (first to third detection portions) 21, 22 and 23 which form the detecting unit 20. The scale 10 is provided so that light irradiated from the detection portions 21 to 23 of the detecting unit 20 is reflected toward the detection portions 21 to 23. Incidentally, n (n is an integer not smaller than 3) detection portions may be provided.

As shown in FIG. 1, the scale 10 has a rectangular film-like board 11, and a track 12 provided on the board 11. The longitudinal directions of the board 11 are moving directions (scanning directions X) of the scale 10 relative to the detecting unit 20 at the time of measurement.

The track 12 is constituted by patterns 12a. The patterns 12a are patterns arranged at intervals of a predetermined pitch (e.g. in the order of µm) along the scanning directions X so that bright portions or dark portions are arranged periodically.

The detecting unit 20 is formed so that the detecting unit 20 can be moved in the scanning directions X relative to the scale 10. The respective detection portions 21 to 23 detect position information from the scale 10. For example, the respective detection portions 21 to 23 are arranged so that the distance between a measurement point of the first detection portion 21 and a measurement point of the second detection portion 22 is the minimum physically allocable distance d, and the distance between a measurement point of the second detection portion 22 and a measurement point of the third detection portion 23 is a distance $\alpha_i d$ ($\alpha_i$ (i=2, 3, . . . , n-1)) larger than the minimum distance d. Incidentally, $\alpha_i$ is a non-integer constant larger than 1.

Specifically, the respective detection portions 21 to 23 irradiate light onto the scale 10 (track 12) and receive the light reflected from the scale 10. The detecting unit 20 detects position information of measurement points of the respective detection portions 21 to 23 based on the light received by the respective detection portions 21 to 23.

The calculating portion 30 specifies the positions of the measurement points of the respective detection portions 21 to 23 based on the detected position information. The calculating portion 30 calculates measurement error on graduations of the scale 10 detected by the respective detection portions 21 to 23 and obtains a precision curve (self-calibration curve). For example, the calculating portion 30 is constituted by a built-in CPU of a computer which stores the obtained self-calibration curve in a storage portion 31, reads a scale calibrating program from the storage portion 31 and executes the program to thereby perform a process of correcting measurement error on the graduations of the scale 10 or achieve various kinds of operations, for example, by referring to the self-calibration curve.

Figure 2:
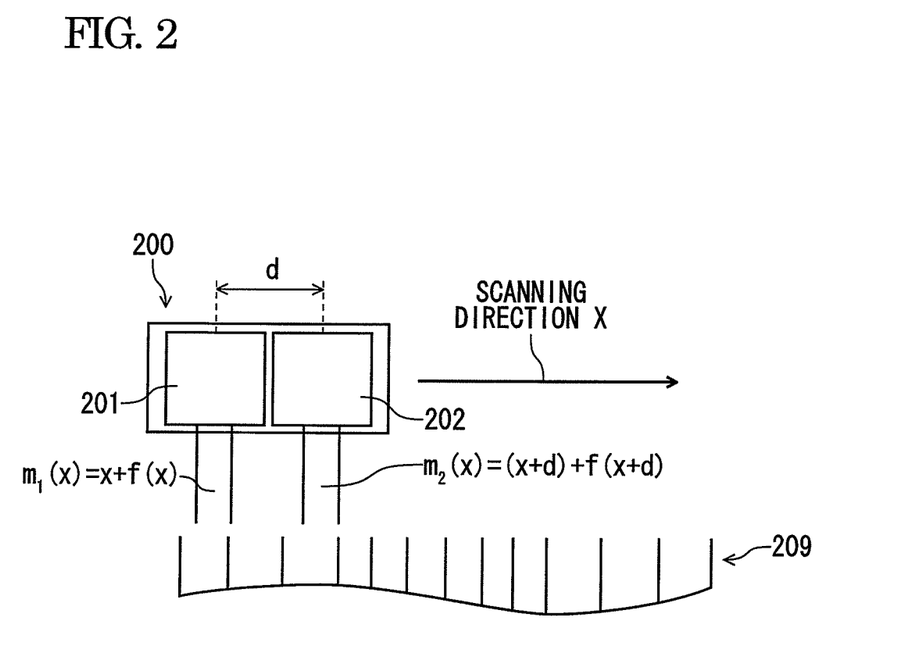
FIG. 2 is a view for explaining a basic principle of self-calibration on graduations of a scale.
Figure 3:
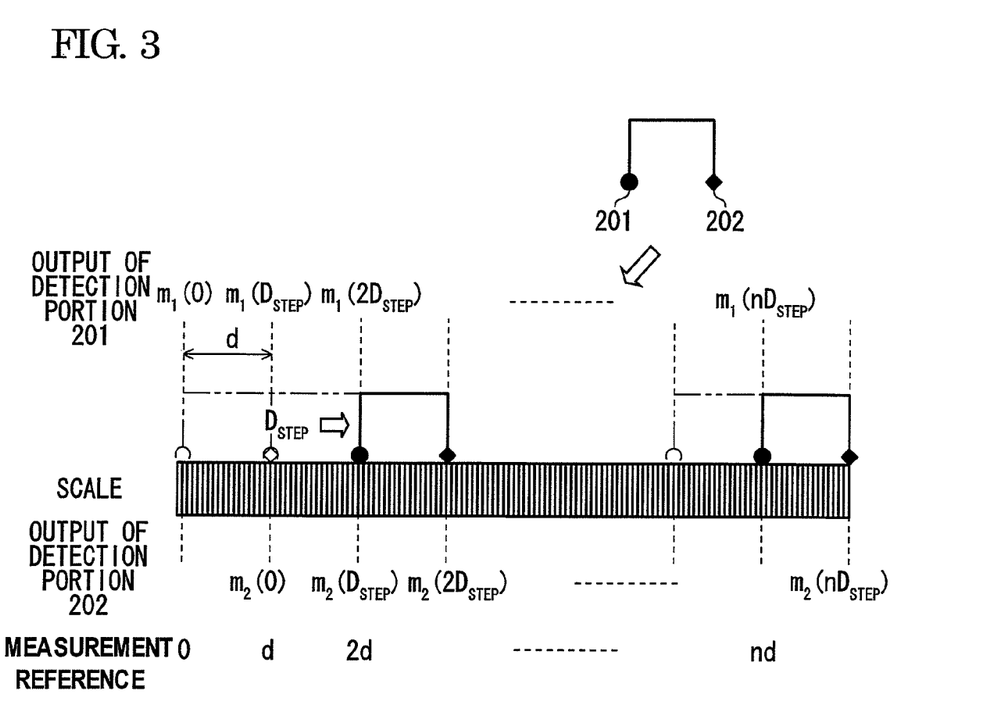
FIG. 3 is a view for explaining the basic principle.

FIGS. 2 and 3 are views for explaining a basic principle of self-calibration on graduations of the scale. As shown in FIG. 2, a detecting unit 200 having a detection portion 201 and a detection portion 202 disposed side by side along a scale 209 having pitch displacement due to distortion is prepared first. For example, the distance between measurement points of the detection portions 201 and 202 is set as d, and the outputs of the detection portions 201 and 202 are set as $m_1(x)$ and $m_2(x)$ respectively. Assuming now that $f(x)$ is measurement error, then the output $m_1(x)$ is given as $m_1(x)=x+f(x)$ and the output $m_2(x)$ is given as $m_2(x)=(x+d)+f(x+d)$.

For measurement, the detecting unit 200 is moved (stepwise) at intervals of a predetermined pitch along a scanning direction X, and the outputs $m_1(x)$ and $m_2(x)$ of the detection portions 201 and 202 are sampled stepwise. When the number of steps required for scanning the whole length of the scale 209 is n and the amount of each step given to the detecting unit 200 is $D_{STEP}$, the outputs $m_1(D_{STEP} \cdot i)$ and $m_2(D_{STEP} \cdot i)$ of the detection portions 201 and 202 at the i-th step (i=0, 1, ..., n) are given by the following expressions (1) and (2) respectively.

[Numeral 1]

$$m_1(D_{STEP} \cdot i) = D_{STEP} \cdot i + f(D_{STEP} \cdot i) \quad (1)$$

[Numeral 2]

$$m_2(D_{STEP} \cdot i) = D_{STEP} \cdot i + d + f(D_{STEP} \cdot i + d) \quad (2)$$

Accordingly, it is found that the output $m_2(D_{STEP} \cdot i)$ has an offset of d compared with the output $m_1(D_{STEP} \cdot i)$. Incidentally, the distance d between measurement points of the detection portions 201 and 202 needs to be obtained by some method in advance.

When the detecting unit 200 is moved stepwise in one (e.g. in a rightward direction in the drawing) of the scanning directions X, the amount of each step is controlled so that the output $m_1(D_{STEP})$ of the detection portion 201 disposed on the rear side in the moving direction is aligned with the output $m_2(0)$ of the detection portion 202 disposed on the one-step preceding side in the moving direction as shown in FIG. 3. On this occasion, the distance d between measurement points of the detection portions 201 and 202 is known. Accordingly, when the output of the detection portion 201 becomes equal to the output of the detection portion 202 at the preceding step, the amount of each step becomes equal to the distance d between the measurement points so that the following expression (3) is established.

[Numeral 3]

$$D_{STEP} = d \quad (3)$$

Incidentally, when the detecting unit 200 is moved first stepwise (in the case of i=1), it is necessary to align the output of the detection portion 201 with the output of the detection portion 202 at the initial position. Accordingly, it is desirable that the scale 209 is an absolute scale but the scale 209 may be an incremental scale according to the position information detecting method.

Measurement error $f(d \cdot i)$ at the i-th step (i=0, 1, ..., n) can be expressed as the following expression (4) in accordance with the aforementioned expressions (1) and (3).

[Numeral 4]

$$f(d \cdot i) = m_1(d \cdot i) - d \cdot i \quad (4)$$

In the aforementioned expression (4), measurement error is calculated based on the output of the detection portion 201 while the sampling position is used as a measurement reference. When the output of the detection portion 201 is acquired and the aforementioned expression (4) is calculated based on the output after each step is completed, measurement error $f(d \cdot i)$ on the whole length of the scale 209 can be obtained and a self-calibration curve based on the measurement error $f(d \cdot i)$ can be obtained.

Although improvement in accuracy of the encoder can be attained when this self-calibration curve is used for correcting graduations of the scale 209, it is impossible to calibrate measurement error of higher-frequency highly accurate graduations by the configuration of the aforementioned basic principle because reduction in the distance d between measurement points is limited. Accordingly, the displacement detecting device according to this embodiment uses the detecting unit 20 having at least three detection portions for performing self-calibration as follows.

Figure 4:
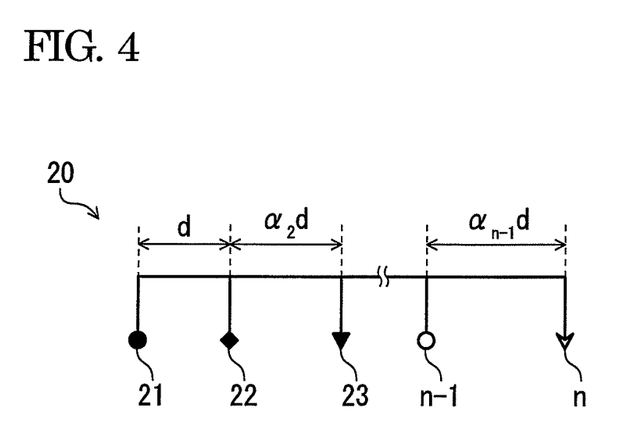
FIG. 4 is a view for explaining a configuration of a detecting unit in the photoelectric encoder.
Figure 5:
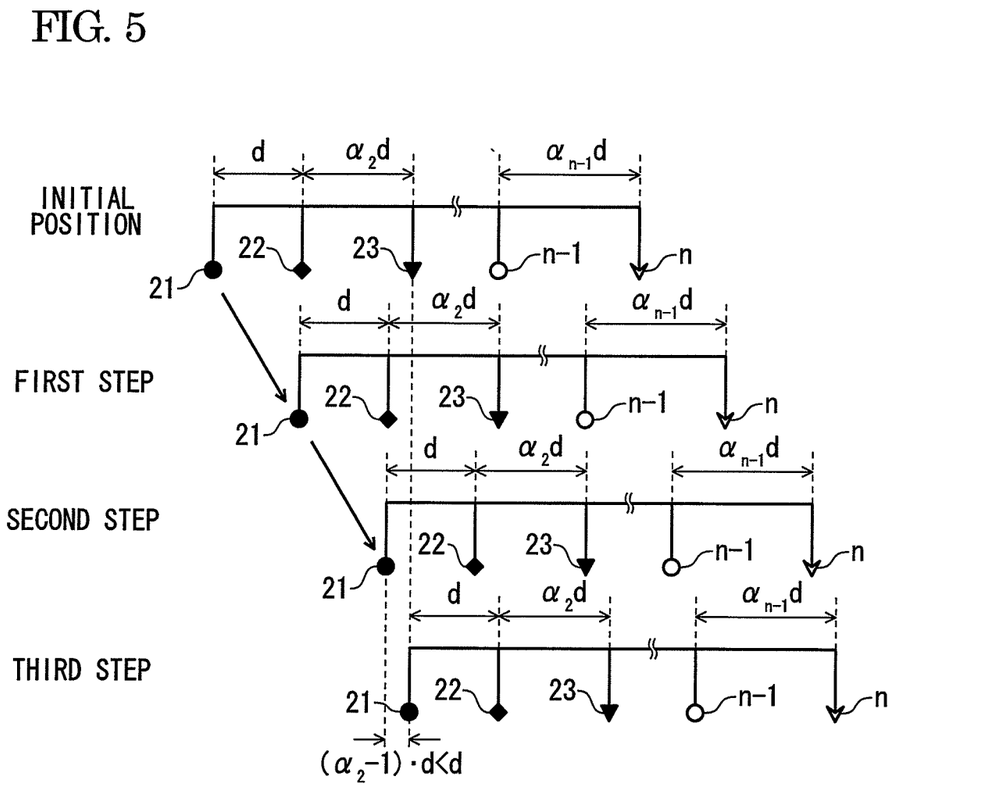
FIG. 5 is a view for explaining steps in the detecting unit.

FIG. 4 is a view for explaining the configuration of the detecting unit in the photoelectric encoder. FIG. 5 is a view for explaining steps in the detecting unit. Although the detecting unit 20 shown in FIG. 1 is formed to have the first to third detection portions 21 to 23, the detecting unit 20 can be formed to have a larger number of detection portions. Accordingly, description will be made here on the assumption that the detecting unit 20 has n (n is an integer not smaller than 3) detection portions.

As shown in FIG. 4, the detecting unit 20 has n detection portions, that is, first to n-th detection portions 21 to n. The distances between measurement points of the respective detection portions are set as d, $\alpha_2 d$, $\alpha_3 d$, ..., $\alpha_{n-1} d$ in view from the first detection portion 21 to the n-th detection portion. $\alpha_i$ is a non-integer constant larger than 1 and is calculated in advance.

First, output data at measurement points of the respective detection portions 21 to n at an initial position are acquired. Then, output data at measurement points in the first step are acquired in such a manner that the detecting unit 20 is moved stepwise in the scanning direction X while the amount of each step is controlled based on the output data acquired at the initial position so that, for example, the output at the measurement point of the first detection portion 21 at the first step is aligned with the output at the measurement point of the second detection portion 22 at the initial position.

Then, output data at measurement points in the second step are acquired in such a manner that the detecting unit 20 is moved stepwise likewise while the amount of each step is controlled based on the output data acquired at the first step so that, for example, the output at the measurement point of the first detection portion 21 at the second step is aligned with the output at the measurement point of the second detection portion 22 at the first step.

Output data at measurement points in the third step are further acquired in such a manner that the detecting unit 20 is moved stepwise likewise while the amount of each step is controlled based on the output data acquired at the initial position so that, for example, the output at the measurement point of the first detection portion 21 at the third step is aligned with the output at the measurement point of the third detection portion 23 at the initial position.

When the detecting unit 20 is moved stepwise while the amount of each step is controlled based on the output data acquired at the measurement points of the second to n-th detection portions 22 to n in accordance with each step so that, for example, the output at the measurement point of the first detection portion 21 is aligned with those at the measurement points of the second to n-th detection portions 22 to n in this manner, a region in which the sampling interval is shorter than the distance d (e.g. the interval $(\alpha_2-1)\cdot d<d$) appears.

Moreover, when the aforementioned step is repeated on the whole length of the scale, a sampling interval shorter than the distance d can be obtained at random. Therefore, though configuration is made so that the distances between measurement points of the respective detection portions 21 to n are all not shorter than d, measurement error can be calculated at a sampling interval not longer than d and a self-calibration curve can be obtained to correct position information of the scale.

Although measurement references for calculating measurement error are sampling positions, all the sampling positions can be calculated back based on the known measurement point distances d to $\alpha_{n-1}d$. In this manner, the displacement detecting device according to this embodiment can be formed without any expensive configuration so that measurement error of graduations can be calibrated easily, inexpensively and accurately.

Figure 6:
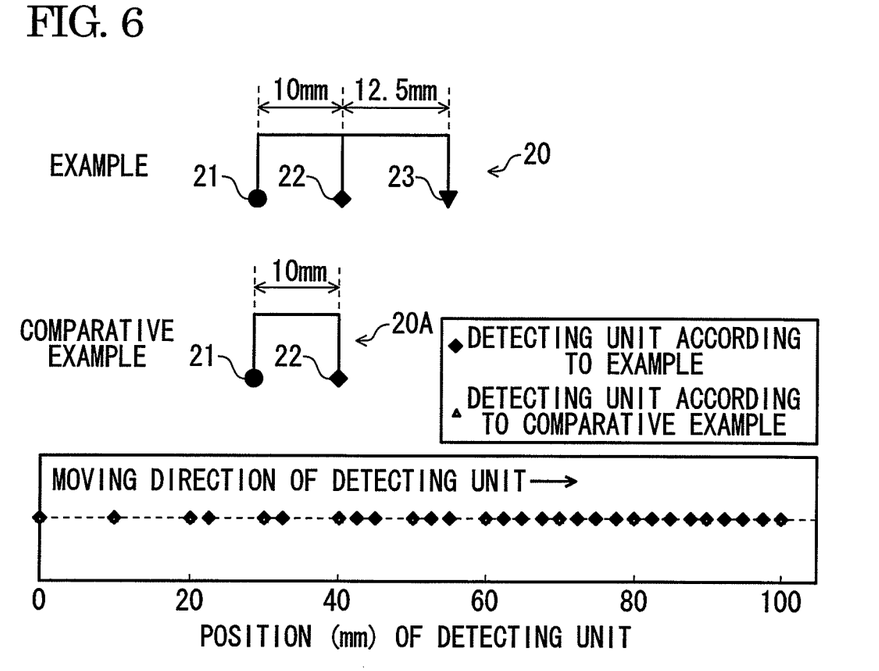
FIG. 6 is a view for explaining operation based on simulation models of detecting units according to Example of the invention and Comparative Example.
Figure 7:
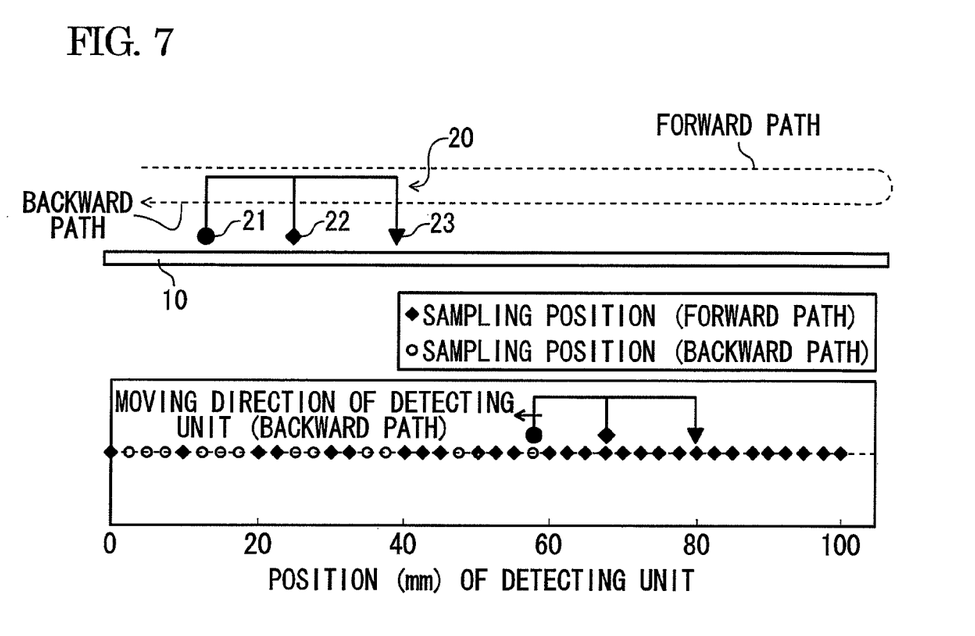
FIG. 7 is a view for explaining operation based on the simulation model of the detecting unit according to Example.

The aforementioned configuration will be described below specifically according to Example. FIG. 6 is a view for explaining operation based on simulation models of detecting units according to Example of the invention and Comparative Example. FIG. 7 is a view for explaining operation based on the simulation model of the detecting unit according to Example.

As shown in FIG. 6, the detecting unit 20 according to Example has such three detection portions that the distance d between measurement points of the first detection portion 21 and the second detection portion 22 is set to be 10 mm and the distance $\alpha_2 d$ between measurement points of the second detection portion 22 and the third detection portion 23 is set to be 12.5 mm.

On the other hand, the detecting unit 20A according to Comparative Example has such two detection portions that the distance d between measurement points of the first detection portion 21 and the second detection portion 22 is set to be 10 mm. Accordingly, the detecting unit 20 is formed so that the aforementioned parameters satisfy n=3, d=1 and $\alpha_2$=1.25 whereas the detecting unit 20A is formed so that the aforementioned parameters satisfy n=2 and d=1.

Obtained sampling positions are simulated on 100 mm in such a manner that each detecting unit 20 or 20A is moved stepwise so that the output at the measurement point of the first detection portion 21 is aligned with the output at the measurement points of the second and third detection portions 22 and 23. As a result, it is obvious that the sampling interval in the detecting unit 20 according to Example is 2.5 mm from the moving region after 60 mm whereas the sampling interval in the detecting unit 20A according to Comparative Example is 10 mm on the whole region.

This indicates that the sampling interval in Example is one fourth as long as the sampling interval in Comparative Example. That is, this indicates that measurement error can be calculated at sampling intervals of 10 mm or shorter even if the distance between measurement points is 10 mm or longer. Accordingly, measurement error of graduations can be calibrated accurately compared with Comparative Example.

Incidentally, in the example shown in FIG. 6, the sampling interval in Example is not always 2.5 mm in the moving region of 0 to 60 mm. Accordingly, it is obvious that higher accuracy can be further attained. It is therefore desirable that configuration is made in such a manner that the detecting unit 20 is reciprocated in the detection range of the scale 10 to add sampling positions as shown in FIG. 7.

Specifically, sampling positions are obtained in a forward path in the aforementioned manner and sampling positions are added in a backward path in such a manner that the detecting unit 20 is moved stepwise so that, for example, the output at the measurement point of the third detection portion 23 is aligned with the outputs at the measurement points of the first and second detection portions 21 and 22 obtained in the forward path. In this manner, the sampling interval can be set to be 2.5 mm on the whole length in the detection range of the scale.

Figure 8:
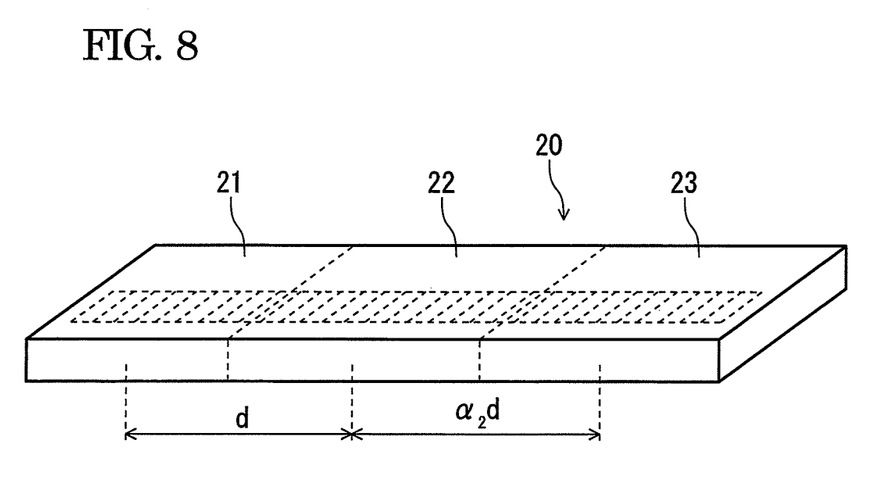
FIG. 8 is a view for explaining a configuration of a detecting unit in a photoelectric encoder which forms a displacement detecting device according to another embodiment of the invention.

Although the embodiment of the invention has been described above, the invention is not limited thereto but various changes, additions, etc. may be made without departing from the gist of the invention. For example, the photoelectric encoder may be a linear type or a rotary type. As shown in FIG. 8, at least three detection portions 21, 22 and 23 of the detecting unit 20 may be made of one photo acceptance element array separated into at least three photo acceptance regions so that, for example, distances d to $\alpha_{n-1}d$ (d and $\alpha_2 d$ in FIG. 8) between measurement points are formed as described above. Further, the invention can be applied not only to an incremental scale having a periodic optical lattice but also to an absolute scale having a pseudo-random code pattern and a multi-track scale having both or either of these scales.

What is claimed is:

1. A displacement detecting device comprising:
   a scale which has an optical lattice;
   a detecting unit which is disposed so as to be movable in a scanning direction relative to the scale and which has n (n is an integer not smaller than 3) detection portions, inclusive of at least a first detection portion, a second detection portion and a third detection portion, arranged in the scanning direction for detecting position information from the optical lattice; and
   a calculating portion configured to obtain a self-calibration curve on graduations of the scale by specifying positions of the detection portions and calculating measurement error based on the position information detected by the detecting unit, wherein:
   the detecting unit is provided so that a distance between the first detection portion and the second detection portion and a distance between the second detection portion and the third detection portion are different from each other and do not form an integral multiple; and
   the calculating portion obtains the self-calibration curve on the graduations of the scale by repeating operation of moving the detecting unit in the scanning direction until position information detected by one of the first to third detection portions is detected by another detection portion, and calculating measurement error based on the detected position information and a distance between the detection portions which have detected the position information,
   wherein the scale has a rectangular shape, the optical lattice comprising bright portions and dark portions, boundary lines between the bright portions and the dark portions being parallel to each other.

2. A displacement detecting device according to claim 1, wherein
   a difference of the distance between the first detection portion and the second detection portion from the distance between the second detection portion and the third detection portion is shorter than a minimum distance d in which the n detection portions can be arranged physically.

3. A displacement detecting device according to claim 1, wherein
the calculating portion reciprocates the detecting unit in the scanning direction and acquires the position information.

4. A displacement detecting device according to claim 1, further comprising
a storage unit configured to store the self-calibration curve, wherein
the calculating portion corrects measurement error of the graduations by referring to the self-calibration curve stored in the storage unit.

5. A displacement detecting device according to claim 1, wherein
the detecting unit is made of single photo acceptance element array comprising at least three detection portions.

6. A scale calibrating method in a displacement detecting device including a scale which has an optical lattice, a detecting unit which is disposed so as to be movable in a scanning direction relative to the scale and which has n (n is an integer not smaller than 3) detection portions, inclusive of at least a first detection portion, a second detection portion and a third detection portion, arranged for detecting position information from the optical lattice so that a distance between the first detection portion and the second detection portion and a distance between the second detection portion and the third detection portion are not different from each other and do not form an integral multiple, and a calculating portion configured to obtain a self-calibration curve on graduations of the scale by specifying positions of the detection portions and calculating measurement error based on the position information detected by the detecting unit, the scale having a rectangular shape, the optical lattice comprising bright portions and dark portions, boundary lines between the bright portions and the dark portions being parallel to each other, the method comprising:
repeating operation of moving the detecting unit in the scanning direction until position information detected by one of the first to third detection portions is detected by another detection portion;
obtaining the self-calibration curve on the graduations of the scale by calculating measurement error based on the detected position information and a distance between the detection portions which have detected the position information; and
correcting the position information of the optical lattice by referring to the obtained self-calibration curve.

7. A scale calibrating method according to claim 6, wherein
the detecting unit is made of single photo acceptance element array comprising at least three detection portions.

8. A scale calibrating program for making a computer execute a scale calibrating method in a displacement detecting device including a scale which has an optical lattice, a detecting unit which is disposed so as to be movable in a scanning direction relative to the scale and which has n (n is an integer not smaller than 3) detection portions, inclusive of at least a first detection portion, a second detection portion and a third detection portion, arranged for detecting position information from the optical lattice so that a distance between the first detection portion and the second detection portion and a distance between the second detection portion and the third detection portion are not different from each other and do not form an integral multiple, and a calculating portion configured to obtain a self-calibration curve on graduations of the scale by specifying positions of the detection portions and calculating measurement error based on the position information detected by the detecting unit, the scale having a rectangular shape, the optical lattice comprising bright portions and dark portions, boundary lines between the bright portions and the dark portions being parallel to each other, the program comprising:
repeating operation of moving the detecting unit in the scanning direction until position information detected by one of the first to third detection portions is detected by another detection portion;
obtaining the self-calibration curve on the graduations of the scale by calculating measurement error based on the detected position information and a distance between the detection portions which have detected the position information; and
correcting the position information of the optical lattice by referring to the obtained self-calibration curve.

9. A scale calibrating program according to claim 8, wherein
the detecting unit is made of single photo acceptance element array comprising at least three detection portions.

* * * * *